United States Patent [19]
Campbell

[11] Patent Number: 5,749,691
[45] Date of Patent: May 12, 1998

[54] REACTION NUT WITH CAM ACTION QUICK FASTENING

[75] Inventor: David Campbell, Ashington, United Kingdom

[73] Assignee: Hedley Purvis Ltd A Company of Great Britain and Northern Ireland, Morpeth, United Kingdom

[21] Appl. No.: 750,070

[22] PCT Filed: Jun. 1, 1995

[86] PCT No.: PCT/GB95/01264

§ 371 Date: Dec. 3, 1996

§ 102(e) Date: Dec. 3, 1996

[87] PCT Pub. No.: WO95/33931

PCT Pub. Date: Dec. 14, 1995

[30] Foreign Application Priority Data

Jun. 7, 1994 [GB] United Kingdom .................. 9411313

[51] Int. Cl.⁶ ................................................... F16B 37/08
[52] U.S. Cl. ................................... 421/433; 411/270
[58] Field of Search .............................. 411/433, 432, 411/267, 266, 265, 270; 285/34

[56] References Cited

U.S. PATENT DOCUMENTS

| | | | |
|---|---|---|---|
| 4,083,288 | 4/1978 | Williams . | |
| 4,083,393 | 4/1978 | Okada | 411/267 |
| 5,118,237 | 6/1992 | Wright | 411/267 |
| 5,139,381 | 8/1992 | Lubreski | 411/267 |
| 5,282,709 | 2/1994 | Chaput | 411/270 |
| 5,378,100 | 1/1995 | Fullerton | 411/267 |
| 5,613,816 | 3/1997 | Cabahug | 411/270 |

FOREIGN PATENT DOCUMENTS 2 193 549 A  10/1988  United Kingdom .

Primary Examiner—Flemming Saether
Attorney, Agent, or Firm—Larson & Taylor

[57] ABSTRACT

A reaction nut for location on a threaded bolt, particularly a bolt to be tensioned by a hydraulic tensioning device, includes a plurality of internally-threaded segments (22) movable between an outer-most inoperative position radially spaced from the bolt (2) and an operative position making threaded engagement with the bolt (2). The segments (22) have tapering surfaces thereon. A primary ring member (16) is movable axially relative to the segments (22) and has a corresponding tapering surface (18) thereon. A first resilient device (20) biases the tapering surface (18) of the primary ring member (16) into engagement with the tapering surfaces on the segments (22). A cam then (26) moves the primary ring member (16) from a rest position to an axially displaced position against the bias of the first resilient device (20) whereby the segments (22) are moved by an associated second resilient device (24) between their operative and inoperative positions.

9 Claims, 5 Drawing Sheets

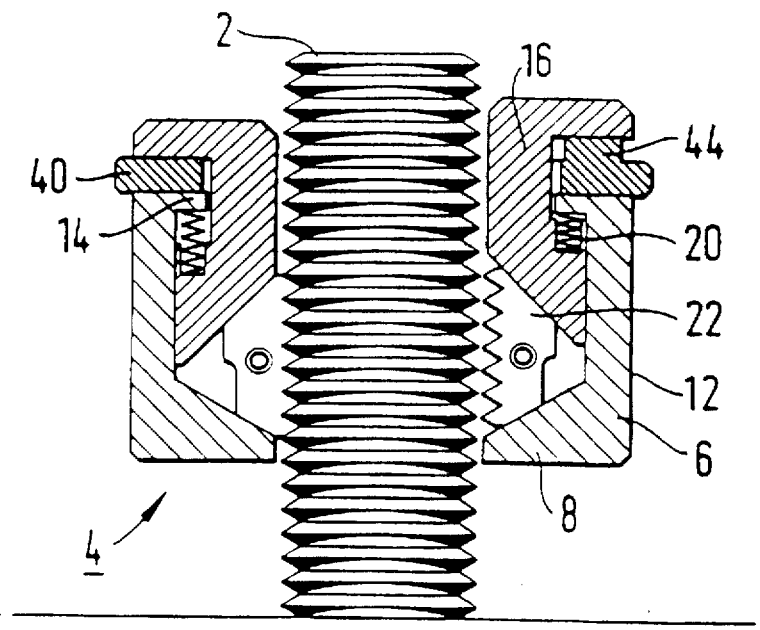
Fig. 4a
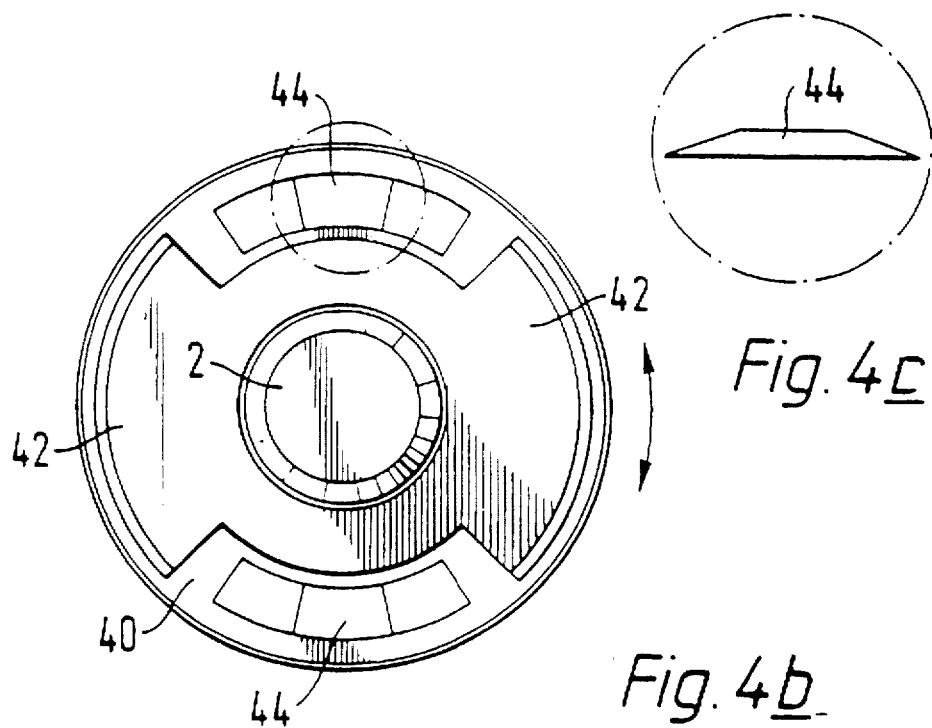
Fig. 4c
Fig. 4b

REACTION NUT WITH CAM ACTION QUICK FASTENING

TECHNICAL FIELD

This invention relates to a reaction nut, and more particularly to such a nut that can be quickly fastened to and released from an associated bolt, a preferred application of the nut being in a hydraulic bolt tensioning device.

BACKGROUND

A hydraulic bolt tensioning device is basically a hydraulic jack positioned over a nut and bolt assembly with the bolt extending centrally through the jack. Hydraulic pressure is applied to the device such that a load is applied to the bolt to stretch the bolt whereby the associated nut can be tightened down to maintain the joint on release of the hydraulic pressure.

Reaction nuts are conventionally screwed onto the bolt, usually above the tensioning devices, to enable the load to be applied to the bolt.

However, the length of bolt extending through and above the tensioning device can often be quite significant, and the application of the reaction nut to the bolt can be a time consuming and exhaustive exercise, especially if the bolts are of large diameter and/or fine thread. This creates particular problems in hazardous environments, such as sub-sea and nuclear, where the time spent by an operator in potentially dangerous areas must be kept to a minimum.

Various proposals have been made to enable relatively quick application of the reaction nut to the associated bolt. U.S. Pat. No. 4083288 discloses a split nut having two halves which can be located onto a bolt in any axial position therealong, the underside of the nut comprising a conical surface which locates into a complementary recess in a washer or other suitable component, the nut being maintained in threaded engagement with the bolt by co-operation between the corresponding conical surfaces of the nut and washer.

This concept has been applied to hydraulic bolt tensioners, for example as disclosed in UK specification no. 2193549 which shows a split reaction nut having a cam surface for engagement by the surface of a complementary recess in the piston of the tensioner.

U.S. Pat. No. 4438901 and UK specification no. 2143608 disclose bolt tensioning devices in which the reaction nut incorporates a hydraulically-operated collet comprising a plurality of segments which, when activated hydraulically, are urged into engagement with the bolt. This concept is well established in most industries utilising pulling/gripping devices such as rope pullers and the like.

The major disadvantages of these known split nuts are that they require an external force initially to engage the split nut/segments, and the maintenance of this force to keep the nut in position. In the absence of this external force, the split nut and the tensioning device would disengage, thus resulting in these devises being difficult, if not impossible, to use in upside down or horizontal positions without operator intervention. It must also be borne in mind that, in practice, tensioning devices are seldom used singularly, and operator intervention on each of a multitude of tensioning devices is clearly undesirable.

SUMMARY OF THE INVENTION

It would be desirable to be able to provide a reaction nut, in particular for a hydraulic bolt tensioning device, which can be applied onto a bolt quickly and with minimal operator intervention.

According to the present invention there is provided a reaction nut for location on a threaded bolt, the nut comprising a plurality of internally-threaded segments movable between an outermost inoperative position radially spaced from the bolt, and an operative position making threaded engagement with the bolt, said segments having tapering surfaces thereon, and a primary ring member movable axially relative to the segments and having a corresponding tapering surface thereon, characterised by first resilient means biasing the tapering surface of the primary ring member into engagement with the tapering surfaces on said segments, and cam means actuation of which moves the primary ring member from a rest position to an axially displaced position against the bias of said first resilient means whereby the segments are moved by associated second resilient means between their operative and inoperative positions.

In one embodiment of the invention, the second resilient means bias the segments towards their inoperative positions, actuation of the cam means resulting in movement of the segments from their operative positions to their inoperative positions enabling ready location of the nut on the associated bolt.

In an alternative embodiment of the invention, the second resilient means bias the segments towards their operative positions, actuation of the cam means resulting in movement of the segments from their inoperative positions to their operative positions whereby the nut is locked onto the bolt.

The cam means may comprise one or more control members extending radially of the segments and biased by third resilient means into outermost positions relative to the segments and the primary ring member, radially inward movement of the or each control member against said third resilient means moving the primary ring member from its rest position to its axially displaced position.

Preferably the or each control member includes a tapering surface thereon engaging the primary ring member to effect said axial movement thereof.

The reaction nut may further comprise a peripheral sleeve member surrounding the or each control member and having an inner surface engaging said control member or members, said inner surface of the sleeve member having a cam profile whereby, on movement of the sleeve member relative to the or each control member, said control member or members are moved radially inwardly to move the primary ring member from its rest position to its axially displaced position.

Said movement of the sleeve member may be rotary or axial.

In an alternative embodiment of the invention, the reaction nut further comprises a secondary ring member coaxial with the primary ring member, a transverse surface of said secondary ring member being provided with a cam profile adapted to co-operate with a transverse surface of the primary ring member in such a manner that rotation of the secondary ring member relative to the primary ring member results in movement of the primary ring member from its rest position to its axially displaced position.

Conveniently actuation of the cam means is effected remotely.

BRIEF DESCRIPTION OF THE DRAWINGS

FIGS. 1a, 2a, 3 and 4a are vertical sections through embodiments of the invention with the portion of the reaction nut to the left in an operative position engaging the bolt, and the portion of the reaction nut to the right in an inoperative position disengaged from the bolt;

FIGS. 1b, 2b and 4b are plan views, partly in transverse section, of the reaction nuts of FIGS. 1a, 2a and 4a respectively; and FIG. 4c is an elevation view of the cam circled with a dot-dash line in FIG. 4b.

DESCRIPTIONS OF THE PREFERRED EMBODIMENTS

Figure 1A:
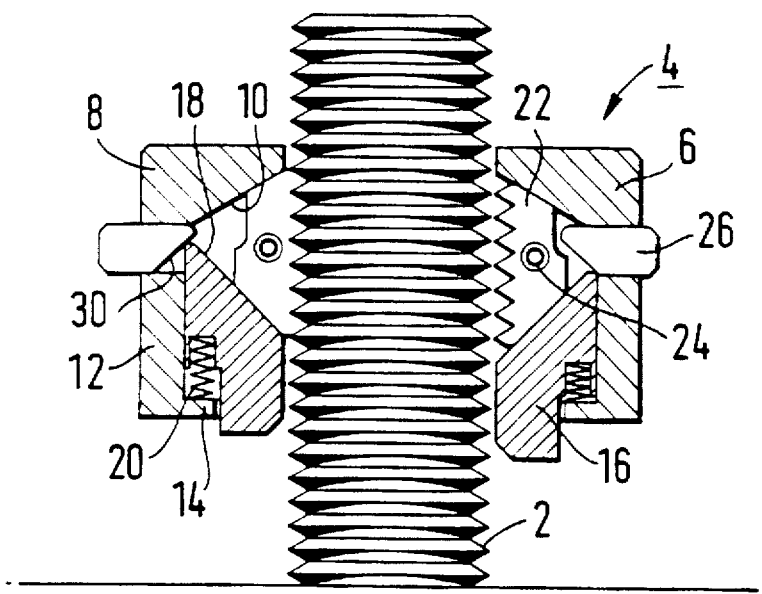
Figure 1B:
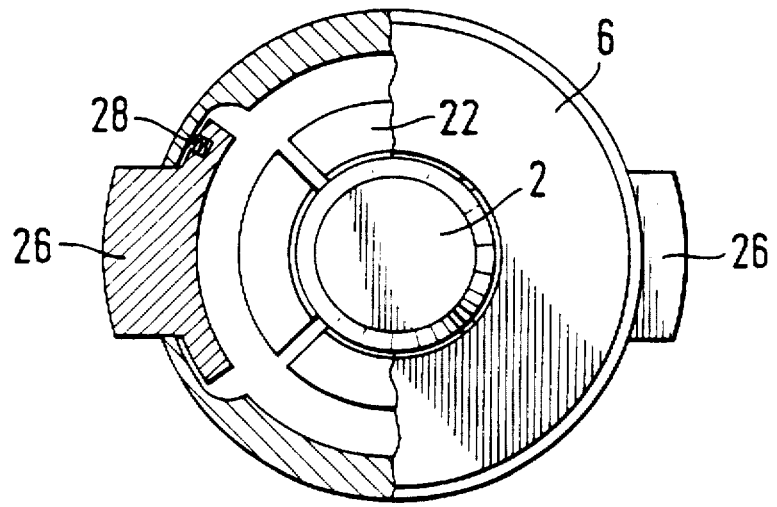

Referring to FIGS. 1a and 1b, there is shown a threaded bolt 2 on which is mounted a reaction nut according to the invention and indicated generally at 4.

The nut 4 comprises an annular body member 6 having a top wall or portion 8 closely surrounding the bolt 2 and having a downwardly and outwardly tapering lower surface 10 thereto. A substantially cylindrical sidewall 12 depends from the top wall 8. An annular flange 14 projects radially inwardly of the lower end of the sidewall 12.

Slidably mounted within the body member 6 is a primary ring member 16 having an upwardly and outwardly tapering upper surface 18 and urged upwardly within the body member 6 by resilient means in the form of a plurality of coil springs 20 reacting between the flange 14 and the underside of the ring member 16.

The reaction nut further comprises an internally threaded collet consisting of four segments 22 surrounding the bolt 2 and having upper and lower tapered surfaces conforming and co-operating with the surfaces 10, 18 respectively. Coil springs 24 are provided between adjacent segments 22 to bias said segments 22 into outermost inoperative positions disengages from the bolt 2.

The springs 20 are stronger than the springs 24, and the arrangement so far described is such that the springs 20 urge the ring member 16 upwardly within the body member 6 so that the tapered surface 18 thereon engages the lower surfaces of the segments 22, and whereby the upper surfaces of the segments 22 are urged into positive engagement with the tapered surface 10 of the body member 6.

Thus it will be appreciated that the segments 22 are urged radially inwardly into threaded engagement with the bolt 2 as seen in the left hand side of FIG. 1a.

A pair of diametrically opposed control members in the form of buttons 26 are mounted in corresponding apertures formed in the sidewall 12 of the body member 6 to project radially therefrom, the buttons 26 being urged by coil springs 28 to the outermost positions shown to the left in FIG. 1a.

The buttons 26 can be moved radially of the nut 4 against the bias of the springs 28 towards innermost positions shown to the right of FIG. 1a, each button 26 having an upwardly and inwardly tapering lower surface 30 thereto. The relative positions of the buttons 26 and the ring member 16 are such that, with the buttons 26 in their outermost positions, and with the ring member in its uppermost position—ie. with the segments 22 closed and in threaded engagement with the bolt 2—the upper, innermost ends of the surfaces 30 on the buttons 26 lie adjacent the top rim of the ring member 16 as seen to the left of FIG. 1a.

Thus it will be appreciated that, on radially inward movement of the buttons 26 against the bias of the springs 28, the tapering surfaces 30 thereon engage the rim of the ring member 16 and move said ring member downwardly within the body member 6 against the bias of the springs 20.

As the ring member 16 moves downwardly, the spacing between the surfaces 10,18 increases whereby the springs 24 can urge the segments 22 outwardly and apart while maintaining contact of the segments 22 with the surfaces 10,18.

On completion of inward movement of the buttons 26, the segments 22 are disengaged from the bolt 2 as seen to the right of FIG. 1a.

On release of the buttons 26, the springs 20, which are stronger than the combined springs 24 and 28, urge the ring member 16 back to its uppermost position and the segments 22 back to their innermost positions, thereby locking the reaction nut 4 to the bolt 2.

In order to apply the reaction nut 4 to the bolt 2, the buttons 26 are depressed to move the segments 22 to their radially outermost positions, and the nut is moved axially down the bolt 2 to the desired position. Once over the bolt 2, the buttons 26 are released, and the nut 4 is effectively locked on the bolt 2.

Although FIG. 1 illustrates an arrangement in which the outermost rest position of the buttons 26 is associated with the segments 22 making locking threaded engagement with the bolt 2, said rest position of the buttons may be associated with the open position of the segments 22, radially inward movement of the buttons 26 closing the segments 22 about the bolt 2.

Figure 2A:
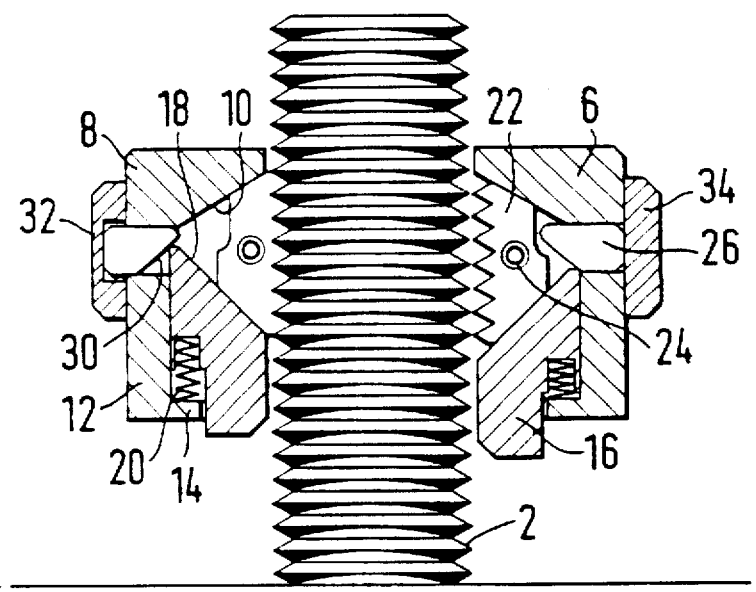
Figure 2B:
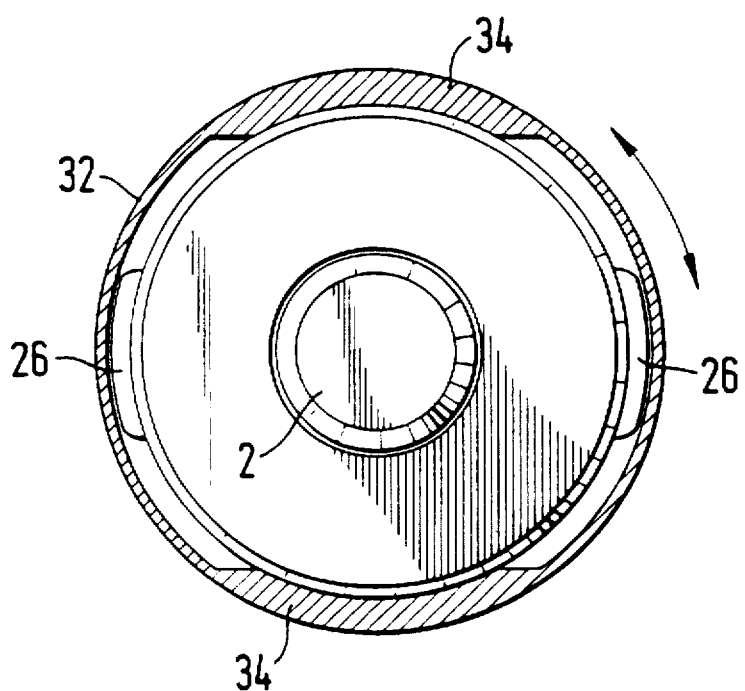

Movement of the buttons 26 may be achieved in a variety of different ways. Referring to FIGS. 2a and 2b, the reaction nut includes a circumferential sleeve 32 mounted on, to surround, the body member 6 and the buttons 26. The sleeve 32 is a rotatable relative to the body member 6 and includes, on its inner surface, a pair of diametrically-opposed cams 34. The configuration of said internal surface of the sleeve 32 is such that, in the angular position shown in FIG. 2b, the buttons 26 are unimpeded and can project to their radially outermost positions. However, on rotation of the sleeve 32 through 90°, the cams 34 are brought into engagement with the buttons 26 to move said buttons 26 radially inwardly to their innermost positions, with consequential movement of the ring member 16 and segments 22.

Figure 3:
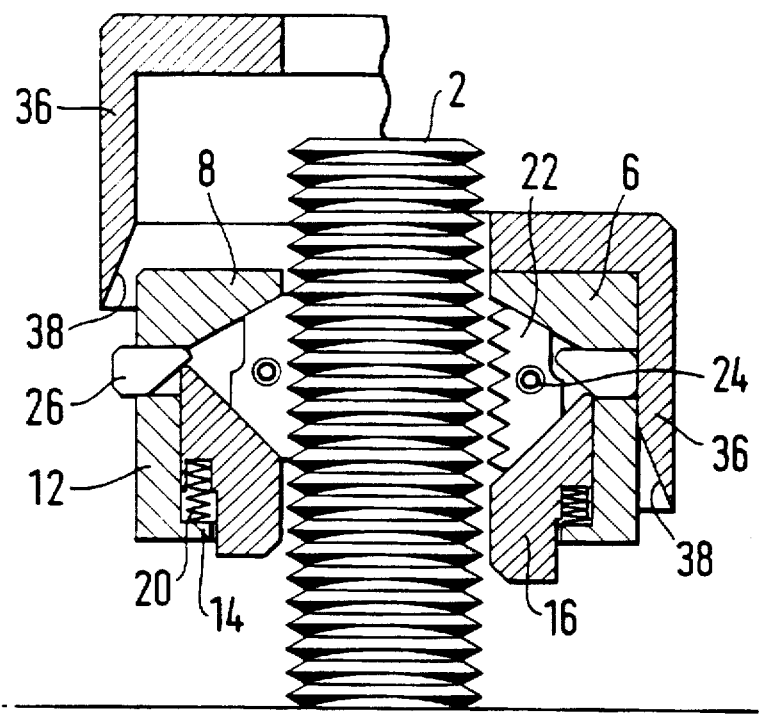

FIG. 3 shows a reaction nut 4 incorporating a control member which is axially movable relative to the remainder of the nut, the control member including a cylindrical sleeve portion 36 the internal surface of the end extent of which is downwardly and outwardly tapered at 38. On downward movement of the control member from the position shown to the left of FIG. 3 to that shown to the right of FIG. 3, the tapering surface 38 engages the buttons 26 to move them radially inwardly to their innermost positions, again with consequential movement of the ring member 16 and segments 22.

FIG. 4 illustrates a reaction nut in which the cam means comprise a rotatable annular ring 40 reacting between the body member 6 and the ring member 16. More particularly, the end of the ring member 16 remote from the surface 18 is provided with a pair of diametrically opposed, radially-outwardly projecting flanges 42 thereon overlying the free end of the body member 6. The ring 40 is located between the flanges 42 and the body member 6, the springs 20 urging the flanges 42 into abutment with a surface of the ring 40.

Said surface of the ring 40 is provided with a pair of diametrically-opposed, upstanding cam profiles 44 thereon as shown in FIG. 4c to effect an increased thickness to the ring 40 in the regions of said profiles 44.

As seen to the left of FIG. 4a and with other than the increased-thickness region of the ring 40 between the flanges 42 and the body member 6, the ring member 16 is in its fully extended position resulting in gripping of the bolt 2 by the segments 22. On rotation of the ring 40 to bring the cam profiles 44 between the respective flanges 42 and the body member 6, the ring member 16 is retracted within the body member 6 against the bias of the springs 20 to release the segments 22 from the bolt 2.

Clearly movement of the ring member 16 between its extended and retracted positions may be achieved by cam means other than those described and illustrated, whether linearly or rotatably operated.

Figure 5:
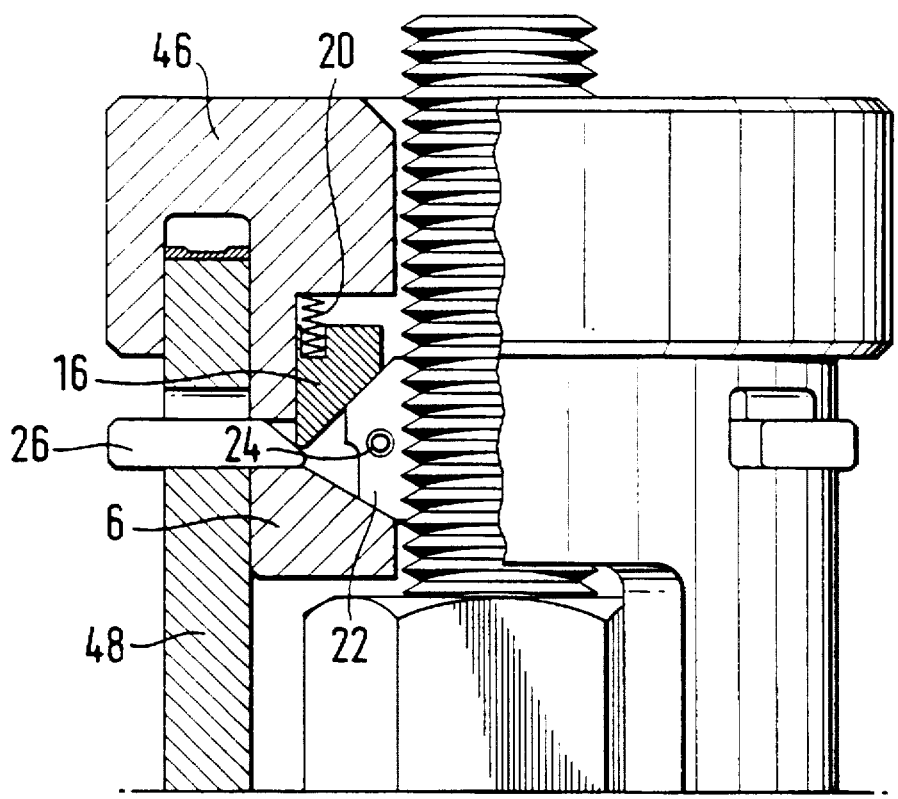
FIG. 5 shows a reaction nut according to the invention incorporated in a bolt tensioning device.

FIG. 5, illustrates a reaction nut substantially in accordance with that of FIGS. 1a and 1b incorporated into a bolt tensioning device. The body member is extended to form the piston 46 of the device slidably mounted in the cylinder 48 through the wall of which the cam means, in this case the buttons 26, extend.

Thus there is provided a reaction nut that is particularly suited to remote control and which has distinct additional advantages over current products.

The nut is of relatively simple construction and is economical to manufacture, maintenance being easy and relatively quick to carry out.

The nut does not require any specific configuration of outer surface to co-operate with the associated joint face, but can be shaped to suit particular requirements without affecting the basic operation of the nut.

The nut is readily adaptable to different methods of operation by the addition thereto of various mechanical or power means. Thus the nut can be readily incorporated into a variety of different bolt working devices, in particular remotely operated devices.

In its simplest form, power operation is not required and the nut can be actuated manually.

The nut is totally self contained, without any additional components that could be lost or mislaid.

The operation of the nut is such that it can be applied very quickly to long bolts, short bolts, corroded bolts, damaged bolts without any loss in reliability.

Under manual operation, and whether the nut is incorporated in a bolt working tool or is used as an independent unit, subsequent operations are hands-free once the nut is applied to the bolt. This improves safety as the operator can stand clear of the equipment while the load is being applied, and reduces operator fatigue, especially in upside-down operations where the operator would otherwise have to hold the weight of the equipment for a good proportion of the operation.

I claim:

1. A reaction nut used for location on a threaded bolt, the nut comprising:

a plurality of internally-threaded segments (22) movable between an outermost inoperative position radially spaced from one another so as to be positioned out of engagement with the bolt (2), and an operative position radially together so as to make threaded engagement with the bolt (2), said segments (22) having tapering surfaces thereon, a primary ring member (16) movable axially relative to the segments (22) and having a corresponding tapering surface (18) thereon.

first resilient means (20) for biasing the tapering surface (18) of the primary ring member (16) into engagement with the tapering surfaces on said segments (22), cam means (26) for moving the primary ring member (16) from a rest position to an axially displaced position against the bias of said first resilient means (20), and associated second resilient means (24) for moving associated segments between their operative and inoperative positions after said cam means moves said primary rind member to the displaced position.

2. A reaction nut as claimed in claim 1 in which the second resilient means (24) bias the segments (22) towards their inoperative positions, whereby actuation of the cam means (26) results in movement of the segments (22) from their operative positions to their inoperative positions thus enabling ready location of the nut (4) on the associated bolt (2).

3. A reaction nut as claimed in claim 1 in which the cam means comprise one or more control members (26) extending radially of the segments (22) and biased by third resilient means into outermost positions relative to the segments (22) and the primary ring member (16), radially inward movement of the or each control member (26) against said third resilient means (28) moving the primary ring member (16) from a rest position to an axially displaced position.

4. A reaction nut as claimed in claim 3 in which the or each control member (26) includes a tapering surface (30) thereon engaging the primary ring member (16) to effect said axial movement thereof.

5. A reaction nut as claimed in claim 3 and further comprising a peripheral sleeve member (32) surrounding the or each control member (26) and having an inner surface engaging said control member or members (26), said inner surface of the sleeve member (32) having a cam profile (34) whereby, on movement of the sleeve member (32) relative to the or each control member (26), said control member or members (26) are moved radially inwardly to move the primary ring member (16) from its rest position to its axially displaced position.

6. A reaction nut as claimed in claim 5 in which movement of the sleeve member (32) is rotary.

7. A reaction nut as claimed in claim 5 in which movement of the sleeve member (32) is linear.

8. A reaction nut as claimed in claim 3 and further comprising a secondary ring member (40) coaxial with the primary ring member (16), a transverse surface of said secondary ring member (40) being provided with a cam profile (44) adapted to co-operate with a transverse surface of the primary ring member (16) in such a manner that rotation of the secondary ring member (40) relative to the primary ring member (16) results in movement of the primary ring member (16) from its rest position to its axially displaced position.

9. A reaction nut as claimed in claim 1 in which the cam means (26) are actuated remotely.

* * * * *